US011955710B2

(12) United States Patent
Wang et al.

(10) Patent No.: US 11,955,710 B2
(45) Date of Patent: Apr. 9, 2024

(54) DUAL POLARIZED ANTENNA STRUCTURE

(71) Applicant: Huawei Technologies Co., Ltd., Shenzhen (CN)

(72) Inventors: Hanyang Wang, Reading (GB); Hang Xu, Canterbury (GB); Steven Gao, Canterbury (GB); Hai Zhou, Reading (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 388 days.

(21) Appl. No.: 17/311,198

(22) PCT Filed: Dec. 7, 2018

(86) PCT No.: PCT/EP2018/083981
§ 371 (c)(1),
(2) Date: Jun. 4, 2021

(87) PCT Pub. No.: WO2020/114607
PCT Pub. Date: Jun. 11, 2020

(65) Prior Publication Data

US 2022/0006183 A1 Jan. 6, 2022

(51) Int. Cl.
*H01Q 1/52* (2006.01)
*H01Q 1/48* (2006.01)
(Continued)

(52) U.S. Cl.
CPC ............... *H01Q 1/523* (2013.01); *H01Q 1/48* (2013.01); *H01Q 21/062* (2013.01); *H01Q 21/24* (2013.01)

(58) Field of Classification Search
CPC ........ H01Q 1/523; H01Q 1/48; H01Q 21/062; H01Q 21/24
(Continued)

(56) References Cited

U.S. PATENT DOCUMENTS

| | | | |
|---|---|---|---|
| 4,063,248 | A | 12/1977 | Debski et al. |
| 6,166,701 | A | 12/2000 | Park et al. |

(Continued)

FOREIGN PATENT DOCUMENTS

| | | | |
|---|---|---|---|
| CN | 103414017 | A | 11/2013 |
| CN | 204966682 | U | 1/2016 |

(Continued)

OTHER PUBLICATIONS

M. Ye, et al., "Single-Layer Circularly Polarized Antenna With Fan-Beam Endfire Radiation," in IEEE Antennas and Wireless Propagation Letters, vol. 16, 2017, 4 pages.

(Continued)

*Primary Examiner* — Peguy Jean Pierre
(74) *Attorney, Agent, or Firm* — Conley Rose, P.C.

(57) ABSTRACT

An antenna structure includes a first signal connector and a second signal connector. The antenna structure further includes a cavity antenna defined by a set of planar walls. The cavity antenna is coupled to the first signal connector and configured to emit a field polarized linearly in a first direction when driven by a signal at the first signal connector. The antenna structure further includes a dipole antenna defined by a pair of arms that are integrated with a wall of the cavity antenna. The dipole antenna is coupled to the second signal connector and configured to a field polarized linearly in a second direction offset from the first direction when driven by a signal at the second signal connector.

20 Claims, 8 Drawing Sheets

(51) Int. Cl.
*H01Q 21/06* (2006.01)
*H01Q 21/24* (2006.01)

(58) Field of Classification Search
USPC .......................................... 343/727, 700 MS
See application file for complete search history.

(56) References Cited

U.S. PATENT DOCUMENTS

| | | | | |
|---|---|---|---|---|
| 9,070,985 | B2 * | 6/2015 | Wang | H01Q 21/28 |
| 2011/0006963 | A1 * | 1/2011 | Tani | H01Q 9/0407 343/700 MS |
| 2013/0328733 | A1 | 12/2013 | Gunnels | |
| 2017/0093050 | A1 * | 3/2017 | Suh | H04B 1/56 |
| 2018/0261906 | A1 | 9/2018 | Hill et al. | |
| 2019/0044243 | A1 | 2/2019 | Vollmer et al. | |

FOREIGN PATENT DOCUMENTS

| | | | |
|---|---|---|---|
| CN | 106384881 | A | 2/2017 |
| CN | 107026321 | A | 8/2017 |
| CN | 107689490 | A | 2/2018 |
| CN | 108701893 | A | 10/2018 |
| KR | 101698125 | B1 | 1/2017 |

OTHER PUBLICATIONS

Zhang, W., et al., "A Planar End-Fire Circularly Polarized Complementary Antenna With Beam in Parallel With Its Plane," IEEE Transactions on Antennas and Propagation, vol. 64, No. 3, Mar. 2016, 7 pages.

Ding, K., et al., "Dual-band and dual-polarized antenna with endfire radiation," IET Microwaves, Antennas and Propagation, 2017, 6 pages.

Liu, P., et al., "Omnidirectional Dual-Polarized Antenna With Sabre-Like Structure," IEEE Transactions on Antennas and Propagation, vol. 65, No. 6, Jun. 2017, 5 pages.

* cited by examiner

DUAL POLARIZED ANTENNA STRUCTURE

CROSS-REFERENCE TO RELATED APPLICATIONS

This application is a U.S. National Stage of International Patent Application No. PCT/EP2018/083981 filed on Dec. 7, 2018, which is hereby incorporated by reference in its entirety.

FIELD OF THE INVENTION

This invention relates to antennas, in particular to providing a compact design for millimeter wave antennas with dual polarizations.

BACKGROUND

An antenna is a transducer that converts radio frequency electric current to electromagnetic waves that are then radiated into space. The electric field, or "E" plane, determines the polarization or orientation of the wave. Generally, most antennas radiate using either linear or circular polarization. In linearly polarized radiation, the electric field vector is confined to a given plane along the direction of propagation. Circular polarization is a combination of two linear perpendicular polarizations, with a 90-degree phase shift between the two.

When an antenna is configured to transmit or receive linearly polarized signals on two orthogonal planes, these can be referred to as horizontal and vertical polarizations. In a fixed antenna arrangement, such as a base station, an antenna may be said to be vertically polarized when its electric field is perpendicular to the Earth's surface. Fixed horizontally polarized antennas may have their electric field parallel to the Earth's surface. In a portable configuration, such as a mobile phone, the 'horizontal' and 'vertical' polarizations may not be defined relative to the Earth's surface but are orthogonal.

Cross polarization can occur when unwanted radiation is present from another antenna emitting differently polarized radiation. This can occur when there is limited isolation between antennas radiating with different polarizations in close proximity. Thus, there is a need for isolation between antennas having different polarizations.

Portable handheld units, such as mobile phones, are often required to receive different signals, which may be horizontally or vertically polarized. Multiple antennas can be used to do this and the antennas can be collocated as long as they are orthogonal and well isolated from each other.

One known design, as disclosed in 'Omnidirectional Dual-Polarized Antenna with Sabre-Like Structure', IEEE Transactions on Antennas and Propagation, Vol. 65, No. 6, June 2017, uses a cavity antenna together with a monopole to achieve better spatial coverage. Other designs use cavity and dipole antennas to generate circular polarization, for example in 'A Planar End-Fire Circularly Polarized Complementary Antenna With Beam in Parallel With Its Plane', IEEE Transactions on Antennas and Propagation, Vol. 64, No. 3, March 2016 and 'Dual-Band and Dual-Polarized Antenna With Endfire Radiation', Research Article 2017, IET Microwaves, Antennas and Propagation. However, these designs are not compact enough to be used in mobile devices and large volume antenna arrangements are required in order to achieve dual polarizations with good isolation.

It is desirable to develop a more compact dual polarized antenna structure.

SUMMARY OF THE INVENTION

According to a first aspect there is provided an antenna structure comprising: a first signal connector; a second signal connector; a cavity antenna defined by a set of planar walls, the cavity antenna being coupled to the first signal connector and configured for emitting a field polarized linearly in a first direction when driven by a signal at the first signal connector; a dipole antenna defined by a pair of arms that are integrated with a wall of the cavity antenna, the dipole antenna being coupled to the second signal connector and configured for emitting a field polarized linearly in a second direction offset from the first direction when driven by a signal at the second signal connector. This enables a design which achieves dual polarization with good isolation, whilst also being compact.

The first and second directions may be orthogonal. For example, the cavity antenna may emit a vertically polarized field and the dipole antenna may emit a horizontally polarized field. The cavity antenna and the dipole antenna may each emit substantially only linearly polarized radiation. This allows different signals to be radiated by the antenna.

The first signal connector may be spaced from the cavity antenna and configured to couple more strongly to the cavity antenna than the dipole antenna. The second connector may be spaced from the dipole antenna and configured to couple more strongly to the dipole antenna than the cavity antenna. This allows the field emitted by each of the antennas to be controlled by the signal connectors.

The arms of the dipole antenna may be elongate in a direction and the first connector is elongate perpendicularly to that direction. This may reduce the coupling between the dipole antenna and the first connector.

The second connector may be elongate parallel to the direction of the arms. Alternatively, the arms of the dipole antenna may be oriented at an acute angle to the direction of elongation of the second connector. For example, the arms may be oriented at an angle of approximately 25, 30, 35, 40, 45, 50, 55, 60 or 65 degrees to the direction of elongation of the second conductor.

The coupling between the first connector and the second connector may be less than −20 dB throughout a frequency range where the return loss of both antennas is less than −10 dB. The present invention may therefore achieve a good range of useful bandwidth.

The structure may be formed on a substrate and the dipole antenna may be located at an edge of the substrate to which the cavity is open. This allows the antenna to be conveniently located at the edge of a device, such as a mobile phone.

The cavity may comprise a ground plane. The ground plane may be made from a conductive material and provide electrical grounding for the structure.

The ground plane may be parallel to the dipole arms. This may help to achieve a more compact configuration.

The cavity may comprise a slit extending between the dipole arms at least part-way through a wall of the cavity. This may improve the performance of the dipole antenna.

The dipole arms may be located within a convex polygon describing the periphery of a wall of the cavity antenna. This may help to achieve a more compact configuration.

The first connector may comprise an elongate conductor extending through the cavity and terminating on the opposite side of a wall of the cavity from the second connector, and a coupling element extending orthogonally to the elongate conductor and parallel to that wall. This may provide efficient coupling to the cavity antenna.

The second connector may be a planar conductor extending parallel to that wall. This may result in a compact antenna configuration.

According to a second aspect there is provided an antenna array comprising at least two antennas having the antenna structure described herein.

BRIEF DESCRIPTION OF THE FIGURES

The present invention will now be described by way of example with reference to the accompanying drawings. In the drawings.

DETAILED DESCRIPTION OF THE INVENTION

Figure 1:
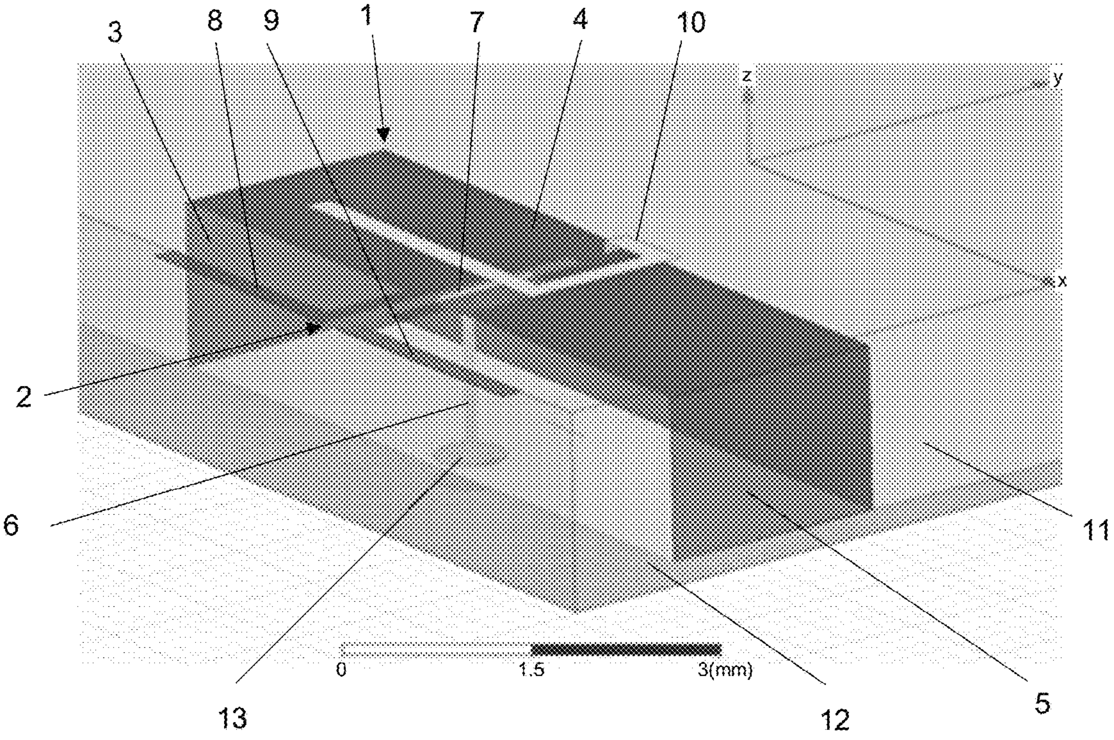
FIG. 1 shows an example of an antenna configuration according to the present invention.

FIG. 1 shows an example of an antenna configuration according to the present invention. The antenna comprises a cavity antenna, shown generally at 1, and a dipole antenna shown generally at 2.

The cavity antenna 1 is defined by a set of planar walls 3, 4, 5. The walls partially enclose a cavity and are arranged such that the walls 3, 4, 5 are at right angles to each other. In FIG. 1, the cavity defined by the walls is longer in one dimension than the other two dimensions. The cavity antenna 1 is coupled to a signal connector 6 and is configured for emitting a vertically polarized field when driven by a signal at the signal connector 6.

Signal connector 6 is configured to couple more strongly to the cavity antenna 1 than the dipole antenna 2. In this example, the signal connector 6 comprises a coaxial cable whose signal lead extends through the cavity. The ground sheath of the coaxial cable is terminated to a ground plane 11. The ground plane forms an additional wall of the cavity. The ground plane is parallel to wall 4 and perpendicular to walls 3 and 5. The signal connector 6 enters the cavity through a hole in the ground plane, shown at 13.

The signal connector further comprises a coupling element 7 extending orthogonally to the direction of elongation of the signal lead of signal connector 6 and parallel to wall 4. The signal connector that drives the cavity antenna is therefore in the form of a bent probe, or L probe. There is a microstrip line below the ground plane (not shown) which is connected to the L probe and feeds the cavity by capacitive coupling. This provides the port for driving the cavity antenna. In this example, the coupling element 7 of the L-shaped signal connector is spaced from the underside of cavity wall 4 by approximately 0.1 mm. The coupling element 7 extends perpendicularly to the direction of elongation of the signal lead of the cable 6 for a distance that is greater than the diameter of the signal lead.

Dipole antenna 2 is defined by a pair of arms, shown at 8 and 9. The dipole arms 8, 9 are integrated with wall 4 of the cavity antenna. The span of the dipole arms may occupy between 50 and 90% of the length of the longest dimension of the cavity, in this case along the longest dimension of wall 4. The cavity comprises a slit extending between the dipole arms through the wall 4 of the cavity. The dipole antenna 2 is coupled to a signal connector in the form of a microstrip line 10. The microstrip is a planar conductor having a width of approximately 0.5 mm. The microstrip extends parallel to the wall of the cavity antenna that defines the dipole arms. The microstrip generates a field that couples to the dipole, such that the dipole is excited by the microstrip. The microstrip line is coupled to the slit between the dipole arms, which feeds the dipole. In this example, the feed line for the dipole (along the slit) is at 90 degrees to the dipole arms. However, the dipole arms may also be at an acute or obtuse angle to the feed line. The dipole antenna is configured for emitting a horizontally polarized field when driven by a signal at the port of the microstrip, which is located at the opposite side of wall 4 to the dipole arms. The body of the microstrip is spaced from the upper surface of wall 4, on the opposite side of wall 4 to the coupling element 7, with a vertical separation of approximately 0.1 mm from the upper surface of wall 4. Microstrip 10 is configured to couple more strongly to the dipole antenna than the cavity antenna. There is approximately 5-20 dB isolation between the dipole and the feed line of the microstrip. In this example, the microstrip is elongate parallel to the direction of the dipole arms.

Ground plane 11 defines a wall of the cavity antenna and the complete arrangement is defined on a printed circuit board 12. In this example, the ground plane 11 is parallel to the dipole arms 8, 9 and the dipole antenna is located at an edge of the substrate to which the cavity 1 is open. In this example, the coaxial cable of signal connector 6 is elongate perpendicularly to the direction of elongation of the dipole arms.

Therefore, the vertical polarization is provided by cavity antenna while the horizontal polarization is achieved by the dipole antenna.

Figure 2:
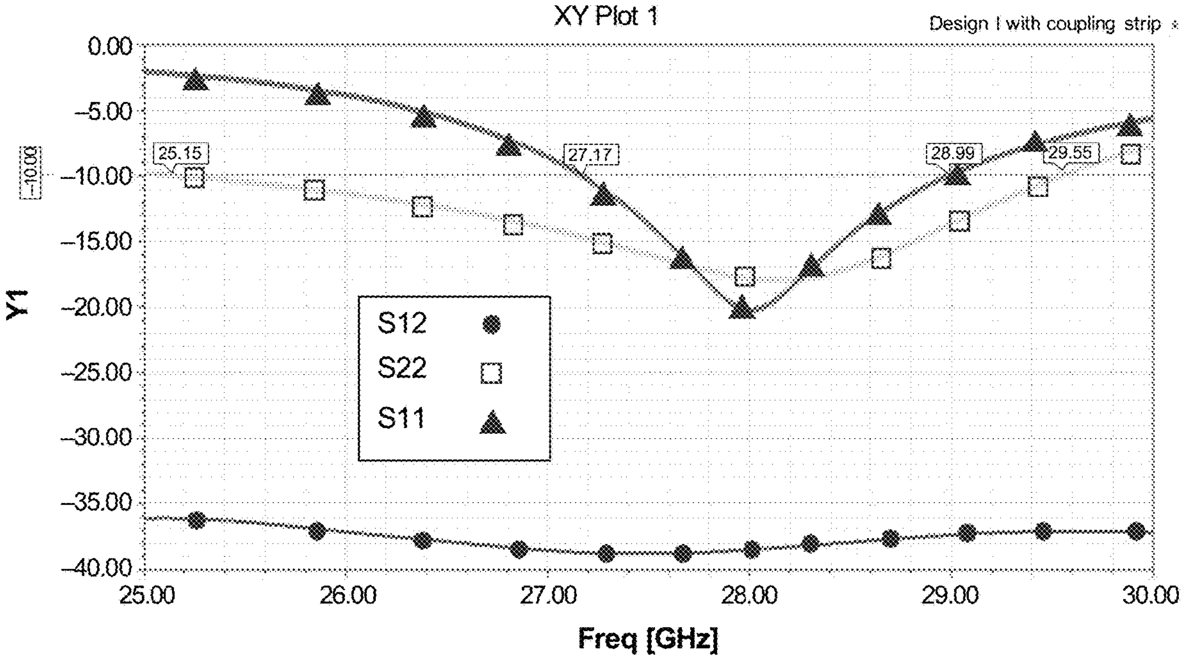
FIG. 2 shows the S-parameters S11, S22 and S12 as a function of frequency for antenna the antenna configuration of FIG. 1.

The performance of the antenna arrangement of FIG. 1 is shown in FIG. 2. FIG. 2 shows a plot of the S-parameters S11, S12 and S22 as a function of frequency.

In general, Snm represents the power transferred from Port m to Port n in a multi-port network. A port is defined as a place where voltage and current can be delivered to the antenna. Here, there are two ports: Port 1 and Port 2. Here, Port 1 is the input to the cavity antenna (vertical polarization) and Port 2 is the input to the dipole antenna (horizontal polarization). S12 represents the power transferred from Port 2 to Port 1. S11 is the return loss of the antenna configuration when driven at Port 1 and represents how much power is reflected from the antenna when driven at Port 1. S22 is the return loss of the antenna configuration when driven at Port 2 and represents how much power is reflected from the antenna when driven at Port 2. If S11=0 dB, all of the power is reflected from the antenna when driven at Port 1 and nothing is radiated. The power that is delivered to the antenna (i.e. not reflected at the port) is either radiated or absorbed as losses within the antenna. Since antennas are typically designed to be low loss, ideally the majority of the power delivered to antennas is radiated.

FIG. 2 shows that the antenna of FIG. 1 radiates best at around 28 GHz, where S11=−20 dB.

Figure 3:
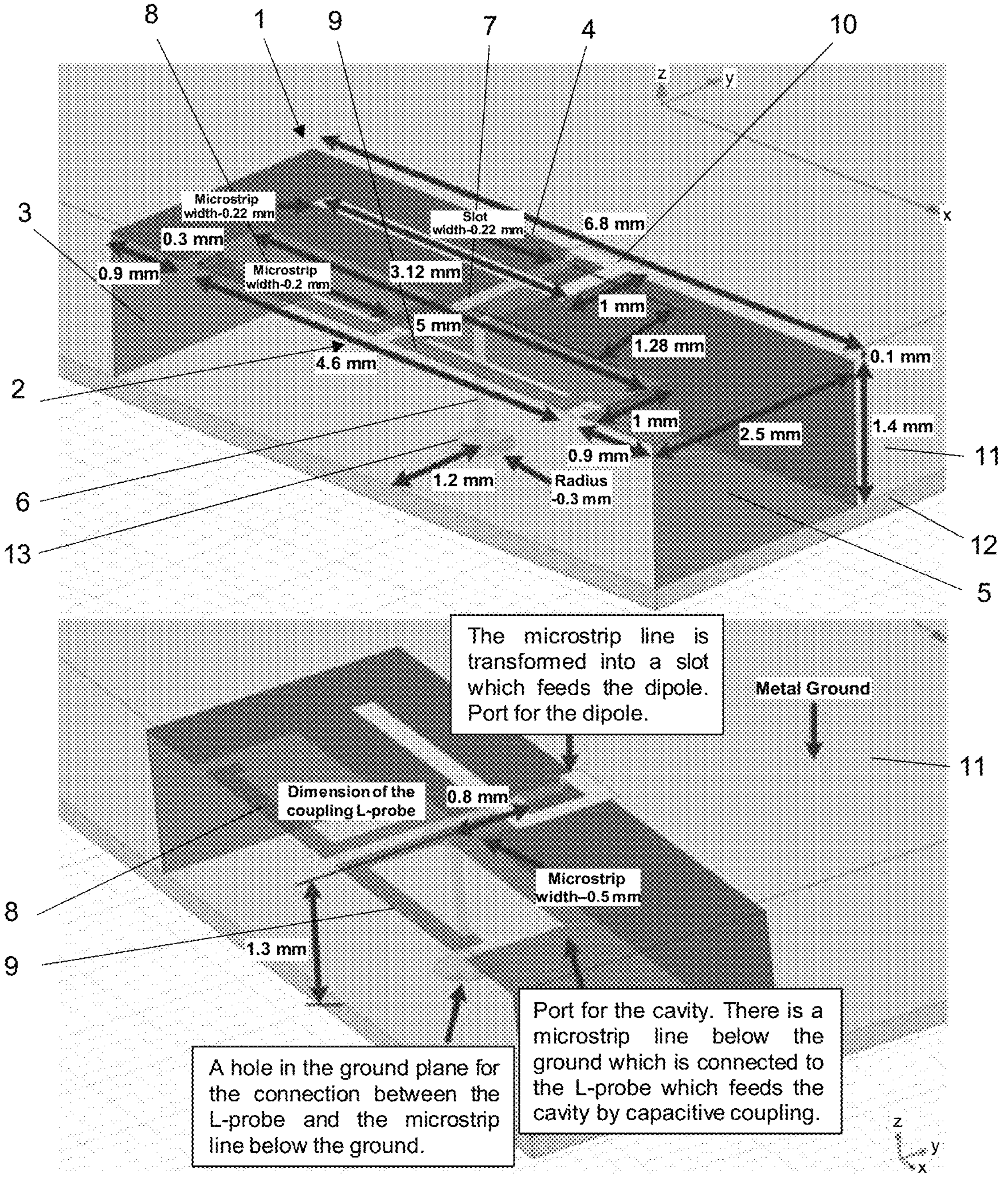
FIG. 3 illustrates a second example of an antenna configuration according to the present invention.

FIG. 3 illustrates a further compacted design to that shown in FIG. 1. In this example, the dipole arms 8,9 are located within the boundary of the wall 4 of the cavity antenna, i.e. the dipole arms are located within a convex polygon describing the periphery of a wall of the cavity antenna. This allows the arrangement to be particularly compact, with dimensions of, for example, 6.8×1.4×2.5 mm.

Figure 4:
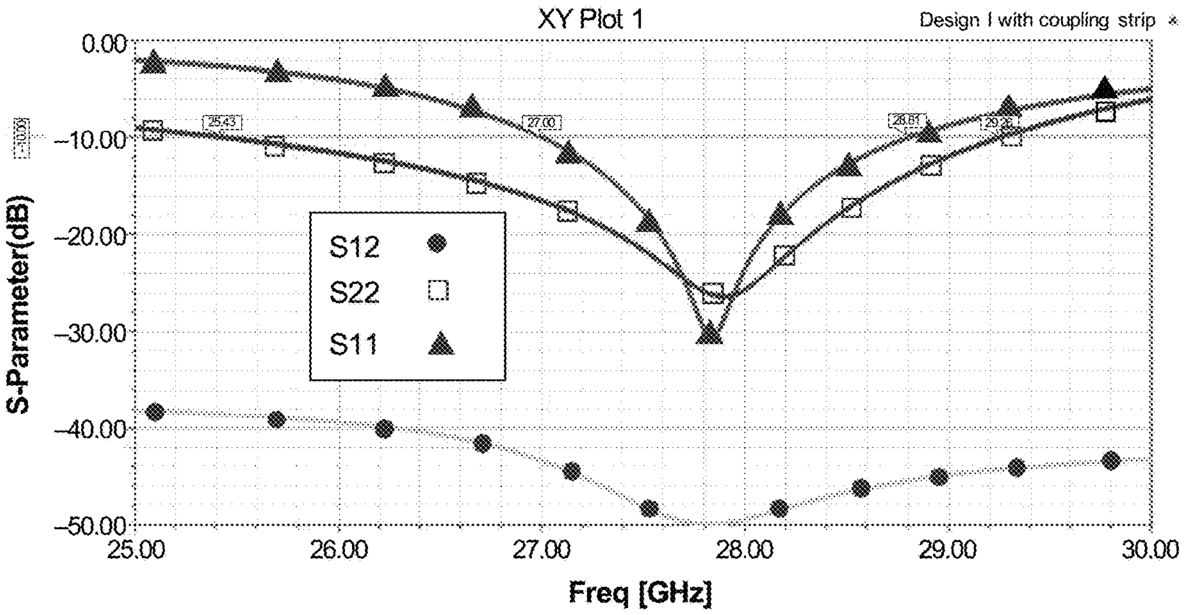
FIG. 4 shows the S-parameters S11, S22 and S12 as a function of frequency for the antenna configuration of FIG. 3.

The S-parameters for the antenna configuration shown in FIG. 3 are shown plotted against frequency in FIG. 4. FIG. 4 shows that the antenna of FIG. 2 radiates best at around 27 GHz, where S11=−31 dB. At this frequency, around 99% of the power is radiated, with only approximately 1% returned to the port. Where S11=−3 dB, around 50% of the power is returned to the port. The antenna has a relatively broad useful bandwidth, with S11 being less than −10 dB between approximately 27.0 to 28.6 GHz frequency. The coupling between the first connector 6, 7 and the microstrip 10 is less than −20 dB throughout the frequency range where the return loss of both antennas is less than −10 dB.

Figure 5:
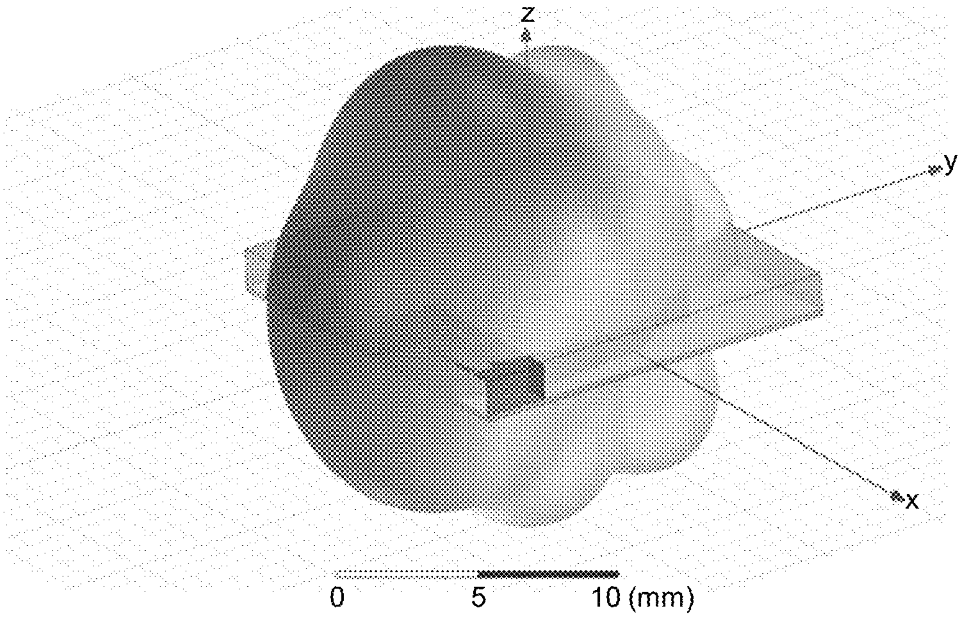
FIG. 5 shows a far field pattern of vertical polarization for antenna configuration in FIG. 3.
Figure 6:
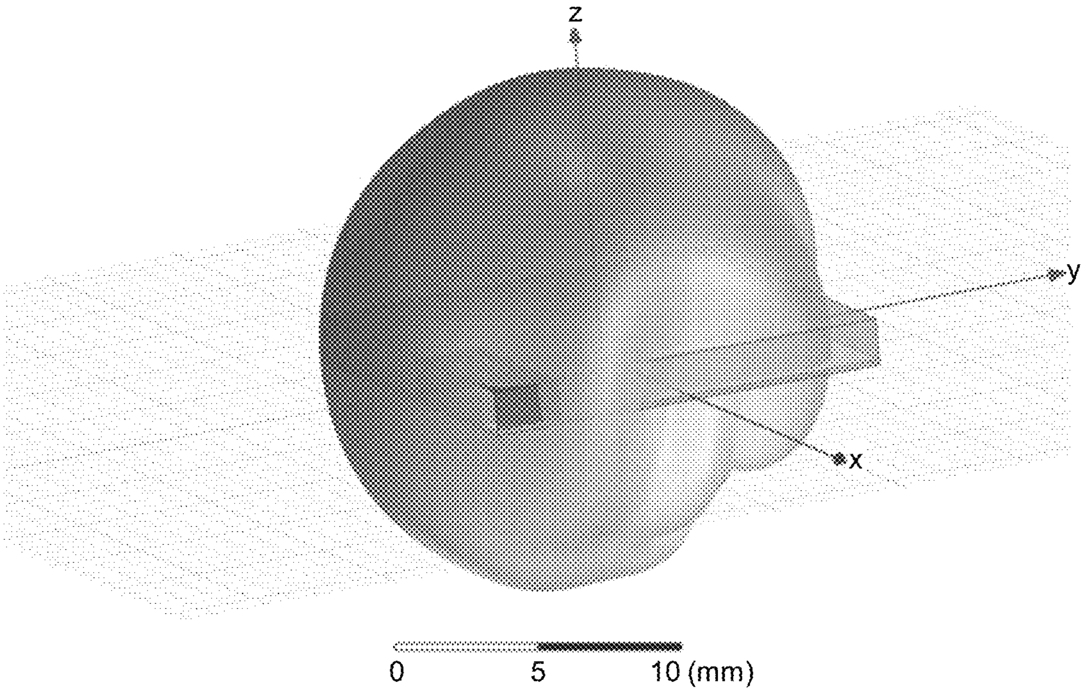
FIG. 6 shows a far field pattern of horizontal polarization for antenna configuration in FIG. 3.

FIGS. 5 and 6 show the far field patterns of vertical and horizontal polarization respectively for the antenna configuration of FIG. 3. It can be seen that each polarization has a generally isotropic emission pattern.

Figure 7:
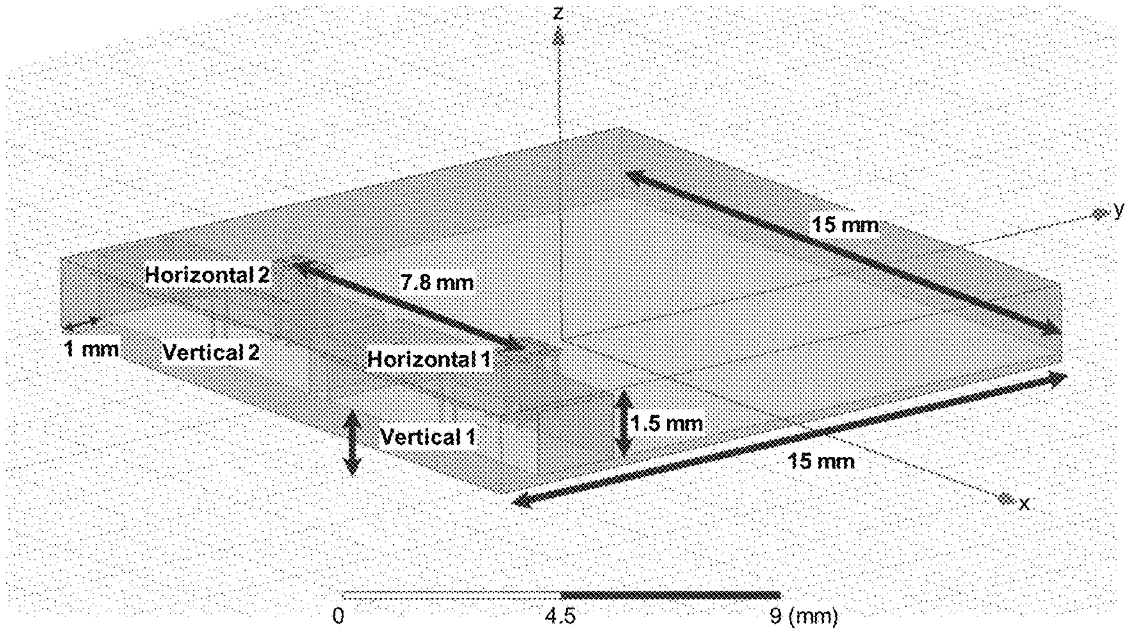
FIG. 7 shows an example of an array configuration using antennas in accordance with the present invention.

The antenna structure of this invention can also be used in array configurations, as shown in FIG. 7. This implementation shows the use of two adjacent antenna units, 1 and 2, each unit emitting both horizontally and vertically polarized fields. More than two units may be used. An antenna array can be linear (1×N) or planar (N×N), where N denotes the number of antenna elements. For the linear array in FIG. 7, N=2.

The associated performance curves for the arrangement of FIG. 7 are shown in FIGS. 8-11.

Figure 8:
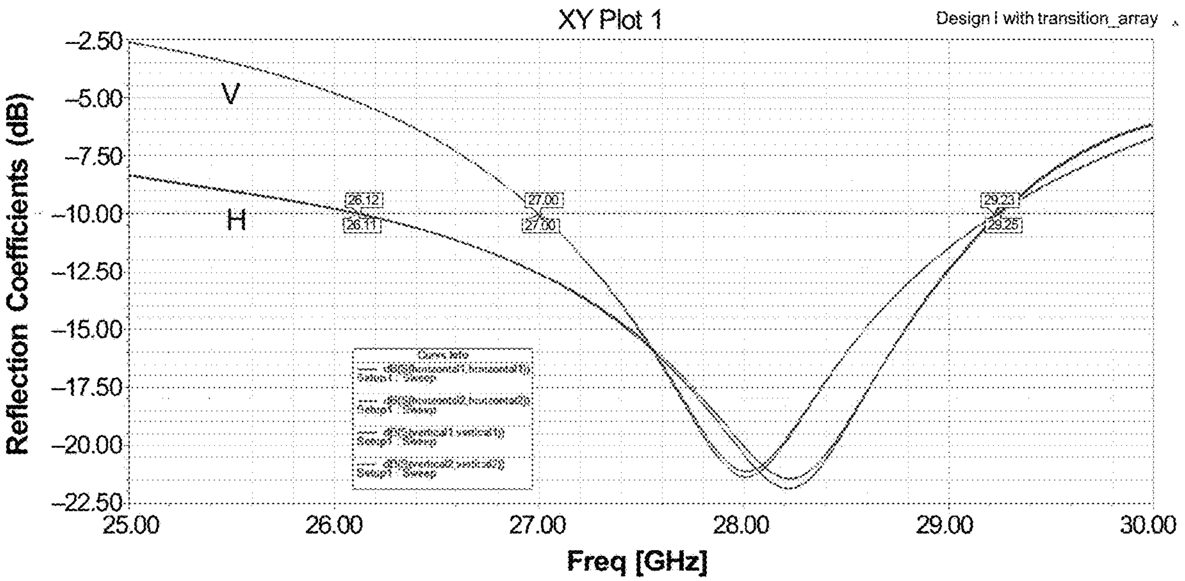
FIG. 8 shows the S11 performance of the array of FIG. 7.

FIG. 8 shows the S11 performances for the antenna elements with horizontal (H) and vertical (V) polarizations. FIG. 8 shows that the antennas radiate best at around 28 GHz, where S11 is in the range −21 dB to −22 dB.

Figure 9:
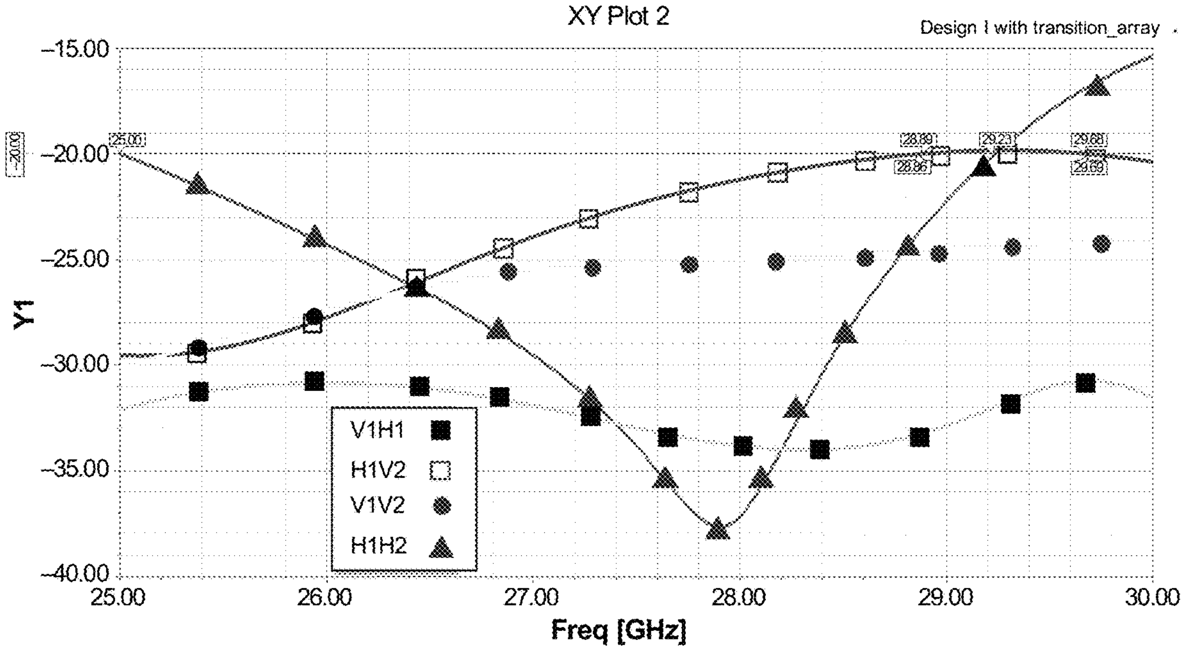
FIG. 9 shows the isolation performance of the array of FIG. 7.

FIG. 9 shows the isolation between the antenna elements shown in FIG. 7. Isolation curves are shown for the isolation between the two antenna elements with vertical polarization (V1V2), between antenna element 1 with vertical polarization and antenna element 1 with horizontal polarization (V1H1), between antenna element 1 with vertical polarization and antenna element 2 with vertical polarization (V1V2) and between the two antenna elements with horizontal polarization (H1H2). The isolation values over this frequency range (25-30 GHz) are less than −20 dB for all combinations shown.

Figure 10:
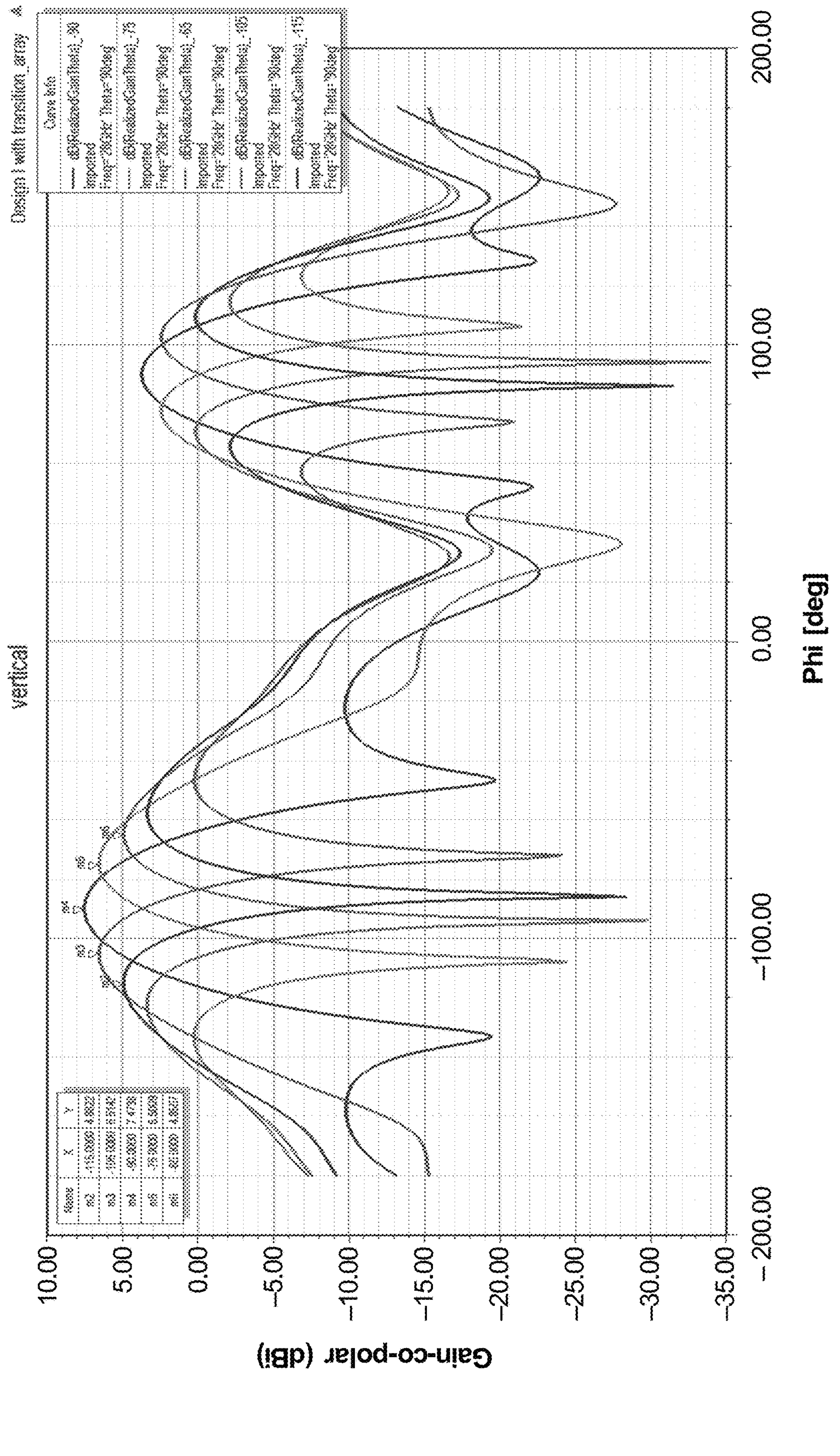
FIG. 10 shows the vertical polarization scanning performance of the array of FIG. 7.
Figure 11:
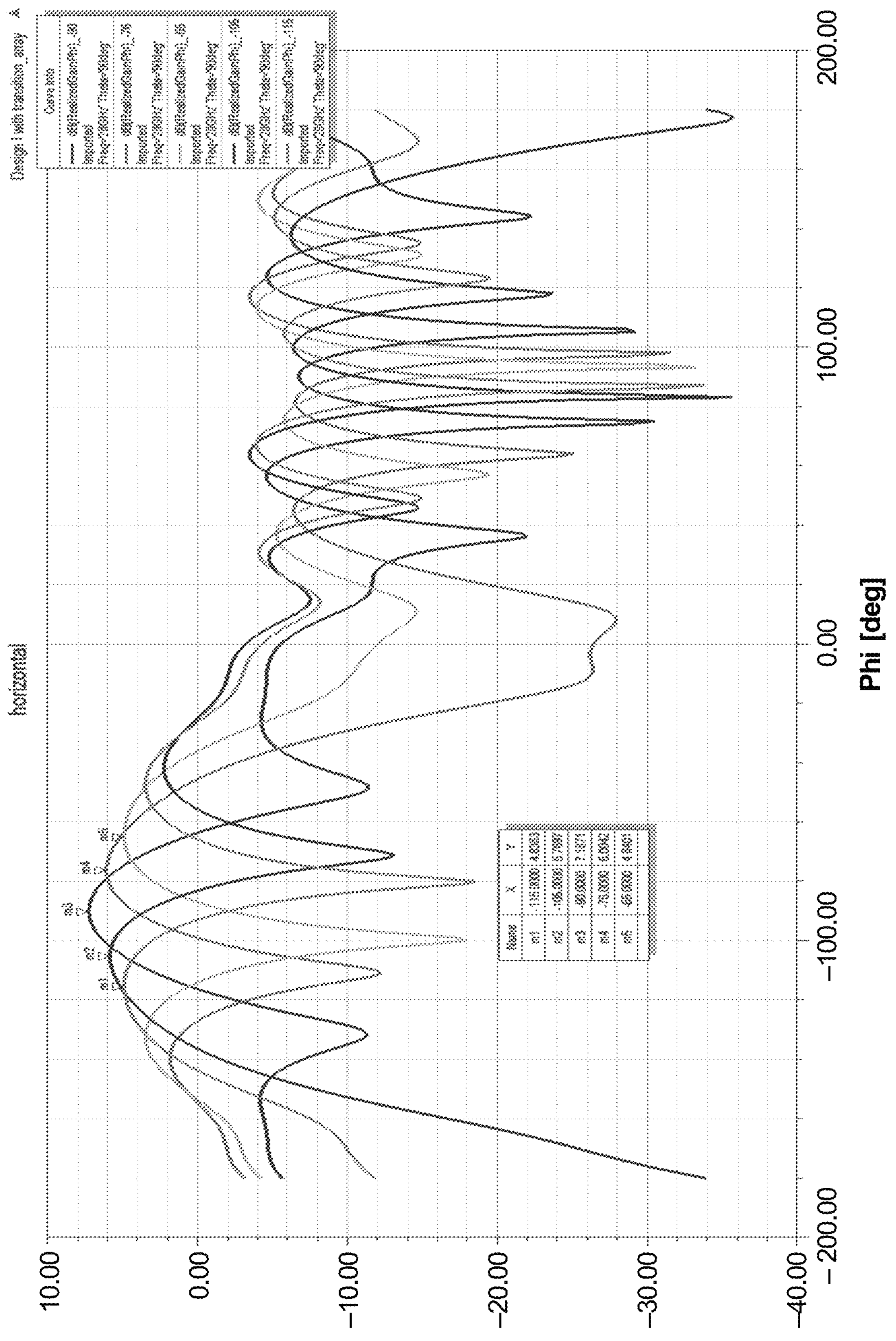
FIG. 11 shows the horizontal polarization scanning performance of the array of FIG. 7.

FIGS. 10 and 11 represent the beam scan performances (radiation patterns with the main beam pointing at a specific angle) for vertical and horizontal polarizations respectively.

Beam scanning is achieved by altering the relative phase of the input signal to the antenna elements. When all antenna elements are fed in-phase (i.e. having the same phase), the direction of maximum radiation is perpendicular to the array. For example, if the linear array is placed along the X-axis and fed in-phase, the direction of maximum radiation in along the Y-axis. This is also known as the boresight of the antenna. Scanning (or changing the direction of maximum radiation) from its boresight is achieved by feeding the antenna element with a progressive phase difference while the antenna is not physically moved or rotated, e.g. first antenna with phase=0, second with phase=30 degrees, third with phase=60 degrees, and so on.

During scanning, the antenna beam width tends to increase and the gain decreases. A good scanning performance is the one with limited gain reduction at wide scanning angles. These curves show that constructive interference can be achieved by the array over certain ranges of scan angle (phi). Good performance is achieved when the reduction in gain with increased scan angle is small.

The antenna configuration described herein integrates a cavity antenna and a dipole antenna in a compact way. By embedding the dipole antenna into one of the cavity walls, good performance can be maintained in terms of antenna efficiency and isolation between the antennas for two orthogonal linear polarizations.

Therefore, orthogonal polarization at millimeter frequency can be achieved with good isolation between the two antennas. The good isolation can be maintained when the antennas are used in arrays.

This antenna configuration can be used in a range of devices, such as mobile phones, base stations, radars or antennas mounted on airplanes.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An antenna structure comprising:
a ground plane;
a first signal connector;
a second signal connector;
a cavity antenna coupled to the ground plane and the first signal connector and defined by planar walls that include a first wall that is parallel to the ground plane, wherein the cavity antenna includes a cavity and is configured to emit a linearly polarized field that is polarized in a first direction when driven by a signal at the first signal connector; and
a dipole antenna defined by a pair of arms that are integrated with the first wall,
wherein the dipole antenna is coupled to the second signal connector and configured to emit a linearly polarized field that is polarized in a second direction offset from the first direction when driven by a signal at the second signal connector, and
wherein the arms of the dipole antenna are elongated in the first direction and the first connector is elongated perpendicularly to the first direction.

2. The antenna structure of claim 1, wherein the first direction is orthogonal to the second direction.

3. The antenna structure of claim 1, wherein the cavity antenna and the dipole antenna each emit substantially only linearly polarized radiation.

4. The antenna structure of claim 1, wherein the first signal connector is spaced from the cavity antenna and configured to couple more strongly to the cavity antenna than the dipole antenna.

5. The antenna structure of claim 1, wherein the second signal connector is spaced from the dipole antenna and configured to couple more strongly to the dipole antenna than the cavity antenna.

6. The antenna structure of claim 1, wherein the antenna structure is formed on a substrate that includes an edge to which the cavity is open.

7. The antenna structure of claim 1, wherein the second connector is elongated parallel to the first direction.

8. The antenna structure of claim 1, wherein the antenna structure is formed on a substrate that includes an edge to which the cavity is open, and wherein the dipole antenna is located at the edge.

9. The antenna structure of claim 1, wherein the cavity is further defined by the ground plane.

10. The antenna structure of claim 9, wherein the ground plane is parallel to the dipole arms.

11. The antenna structure of claim 1, wherein the cavity comprises a slit extending between the dipole arms at least partway through a second wall of the cavity.

12. The antenna structure of claim 1, wherein the dipole arms are located within a convex polygon defining a periphery of the cavity antenna.

13. The antenna structure of claim 1, wherein the first connector comprises:

an elongate conductor extending through the cavity and terminating on an opposite side of a second wall of the cavity from the second connector; and a coupling element extending orthogonally to the elongate conductor and parallel to the second wall of the cavity.

14. The antenna structure of claim 13, wherein the second connector is a planar conductor extending parallel to the second wall.

15. An antenna array comprising:

at least two antennas having an antenna structure, the antenna structure comprising:

a ground plane;

a first signal connector;

a second signal connector;

a cavity antenna coupled to the ground plane and the first signal connector and defined by planar walls including a first wall that is parallel to the ground plane, wherein the cavity antenna includes a cavity and is configured to emit a linearly polarized field that is polarized in a first direction when driven by a signal at the first signal connector; and a dipole antenna defined by a pair of arms that are integrated with the first wall, wherein the dipole antenna is coupled to the second signal connector and configured to emit a linearly polarized field that is polarized in a second direction offset from the first direction when driven by a signal at the second signal connector, and wherein the arms of the dipole antenna are elongated in a third direction and the first connector is elongated perpendicularly to the third direction.

16. An antenna array as claimed in claim 15, wherein the first and second directions are orthogonal.

17. An antenna array as claimed in claim 15, wherein the second connector is elongate parallel to the third direction.

18. An antenna array as claimed in claim 15, wherein the antenna structure is formed on a substrate and the dipole antenna is located at an edge of the substrate to which the cavity is open.

19. An antenna array as claimed in claim 15, wherein the cavity is further defined by the ground plane, and wherein the ground plane is parallel to the dipole arms.

20. An antenna array as claimed in claim 15, wherein the cavity comprises a slit extending between the dipole arms at least part-way through a second wall of the cavity.

* * * * *